(12) United States Patent
Fulling

(10) Patent No.: US 8,557,049 B2
(45) Date of Patent: Oct. 15, 2013

(54) PROCESS FOR CLEANING SUBSTRATES WITH OXIDISING AGENTS AND REDUCING AGENTS

(76) Inventor: Rainer Fulling, Remscheid (DE)

( * ) Notice: Subject to any disclaimer, the term of this patent is extended or adjusted under 35 U.S.C. 154(b) by 636 days.

(21) Appl. No.: 12/676,716

(22) PCT Filed: Aug. 27, 2008

(86) PCT No.: PCT/EP2008/006995
§ 371 (c)(1),
(2), (4) Date: Oct. 22, 2010

(87) PCT Pub. No.: WO2009/030405
PCT Pub. Date: Mar. 12, 2009

(65) Prior Publication Data
US 2011/0023913 A1    Feb. 3, 2011

(30) Foreign Application Priority Data
Sep. 5, 2007 (DE) .......................... 10 2007 041 991

(51) Int. Cl.
*B08B 3/00* (2006.01)
*B08B 3/08* (2006.01)

(52) U.S. Cl.
CPC ........................................ *B08B 3/08* (2013.01)
USPC .......................................................... 134/29

(58) Field of Classification Search
USPC .......................................................... 134/29
See application file for complete search history.

(56) References Cited

U.S. PATENT DOCUMENTS

| | | | |
|---|---|---|---|
| 3,132,052 A | 5/1964 | Crowe et al. | |
| 3,962,496 A * | 6/1976 | Leech | 427/306 |
| 4,297,224 A | 10/1981 | Macchiarolo et al. | |
| 4,425,380 A | 1/1984 | Nuzzi et al. | |
| 4,816,061 A | 3/1989 | Walter, Jr. et al. | |
| 4,966,716 A | 10/1990 | Favstritsky et al. | |
| 5,128,045 A | 7/1992 | Parsons et al. | |
| 5,128,051 A | 7/1992 | Theis et al. | |
| 5,670,055 A | 9/1997 | Yu et al. | |
| 6,183,646 B1 | 2/2001 | Williams et al. | |
| 6,287,473 B1 | 9/2001 | Yang et al. | |
| 6,380,182 B1 | 4/2002 | McNeel et al. | |
| 2003/0132160 A1 | 7/2003 | Khudenko | |
| 2003/0146169 A1 | 8/2003 | Ciampi et al. | |

FOREIGN PATENT DOCUMENTS

| | | |
|---|---|---|
| DE | 1083232 B | 6/1960 |
| EP | 0397184 A1 | 11/1990 |
| WO | WO-02/064718 A1 | 8/2002 |
| WO | WO-03011347 A1 | 2/2003 |
| WO | WO-03092919 A1 | 11/2003 |
| WO | WO-2007019249 A1 | 2/2007 |

OTHER PUBLICATIONS

International Application No. PCT/EP2008/006995, International Search Report and Written Opinion (German), (Dec. 17, 2008), 13 pgs.
International Application No. PCT/EP2008/006995, International Preliminary Report on Patentability mailed Apr. 15, 2010, (English Translation), 7 pgs.
International Application No. PCT/EP2008/006995, Written Opinion mailed Dec. 17, 2008, (English Translation), 5 pgs.
Raszka, A., et al., "The role and significance of extracellular polymers in activated sludge. Part I: Literature review", Acta hydrochim. hydrobiol., 34(5), (2006), 411-424.

* cited by examiner

*Primary Examiner* — Gregory Webb
(74) *Attorney, Agent, or Firm* — Schwegman, Lundberg & Woessner, P.A.

(57) ABSTRACT

The present invention relates to a method for the purification of substrates, characterized in that the purification is carried out by at least one oxidation agent, selected from the group consisting of permanganate and ferrate (VI), and subsequently by a reduction agent. Organic residue, such as legionella or extracellular polymer substances (EPS) can be removed from surfaces of filtration or classification devices and from transport and storage devices utilizing said method. The use of oxidation agents further relates to the oxidation of extracellular polymer substances (EPS).

13 Claims, No Drawings

PROCESS FOR CLEANING SUBSTRATES WITH OXIDISING AGENTS AND REDUCING AGENTS

PRIORITY CLAIM TO RELATED APPLICATIONS

This application is a national stage application under 35 U.S.C. §371 of PCT/EP2008/006995, filed Aug. 27, 2008, and published as WO 2009/030405 A1 on Mar. 12, 2009, which claims priority to German Application No. 10 2007 041 991.2, filed Sep. 5, 2007, which applications and publication are incorporated herein by reference and made a part hereof in their entirety, and the benefit of priority is claimed thereto.

The present invention concerns a process for cleaning substrates with permanganate and ferrate (VI) as oxidising agents and subsequently with reducing agents. Furthermore, the present invention concerns using oxidising agents for oxidising extracellular polymer substances (EPS).

Hard substances form a natural biotope for a wide range of organisms. The organic deposits of these organisms are called "biofilm" or "biofouling". The various coatings or agglomerations based upon biofouling cause substantial disadvantages in the technical arena. These deposits have the effect of substantially impairing the performance of storage, filtering, classification and transport devices. For example, narrowing pipe cross-sections obstructs flowthrough and there is also the possibility of damage from erosion or corrosion. The consequence is greater expenditures for servicing or operating. Furthermore, the coatings held together with biofouling in drinking water pipelines are feared to be the point of departure for legionella contamination and they also have an impact on heat transition and flow velocity. Finally, biofouling coatings on measuring and control instruments can have an impact on the functionality of systems.

EPS are among the foremost groups of substances in organic deposits (Raszka, A.; Chorvatova, M.; Wanner J. *Acta hydrochim. hydrobiol.* 2006, 34, 411-424). These are substances that are excreted by microorganisms. EPS consist of biopolymers. Hydrogels form by absorbing water, which forms a mucous matrix. This gives the biofilm a stable shape. EPS consist of highly molecular substances that may contain polysaccharides, proteoglycanes, proteins, glycoproteins, lipids and nucleic acids. This very thin and slippery biofouling mucous layer is often only 15 µm or less (for instance <0.3 µm) and can be structured in several layers on top of one another.

Due to the disadvantages described above, it is desirable to remove these deposits. However, it has come to light that chlorinating or other customary chemical treatments such as with aldehydes (for instance, formaldehyde) and antibiotics do not have any, or only an insufficient, impact on biofouling, if any at all (WO02/064718A1).

Various processes have been described for removing biofouling.

WO03/092919A1 describes a process for simultaneously cleaning and disinfecting systems of industrial water by dissolving alkali chlorites and chlorates with acids in the industrial water and pumping for 72 h circulating through the system and releasing chlorine dioxide.

The publication WO2007/019249A1 describes a compound that contains an active oxygen donor with an alkaline pH value such as hydrogen peroxide or peracetic acid that is supposed to make it possible to remove biofouling from all surfaces that are in contact with water. However, neither hydrogen peroxide at pH 12 nor sodium hypochlorite (which is more effective at room temperature) is capable of completely removing biofouling (refer to Strugholtz et. al., The effectiveness of various chemicals in removing the fouling matrix of membranes from drinking water treatment, $6^{th}$ Conference on Domestic Water Supplies and Process Engineering, Aachen, Germany, Erftverband Bergheim, paper W 11 2006).

US03132052A1 reveals nitrosyl sulphuric acid and anhydride compounds that remove fouling deposits.

WO03/011347A1 uses mixtures of a stabilised bromine solution to prevent biofouling formation that not only contains a bromine compound and a stabiliser, but also an oxidising agent such as permanganate. However, chlorine, hypochloric acid and its salts are preferred. The printing patent specification U.S. Pat. No. 6,287,473B1 reveals caustic oxidising bromine compounds for controlling biofouling in industrial water systems. It also uses bromine chloride, a halogen stabiliser and alkaline-earth metallic hydroxide in solution.

U.S. Pat. No. 6,183,646 describes a desalinisation system that uses an osmotic membrane. Moreover, a process for preventing biofouling is claimed. Oxidising agents are used for preventing the growth of biological organisms such as hydrogen peroxide, chlorine or ozone.

The printing patent specification U.S. Pat. No. 6,380,182B1 describes a compound where sulphonic acid or its salts are used to keep biofouling under control in aqueous systems.

There are also descriptions of organic compounds for removing or preventing biofouling. For instance, U.S. Pat. No. 5,128,051A reveals ortho-phthalaldehyde.

WO02/064718A1 claims a cleanser that contains food preservatives and non-toxic (in particular organic) acids.

U.S. Pat. No. 4,816,061A reveals a method where alkyl thioalkylamine derivatives are used with an alkaline pH-value and a high level of water hardness.

Furthermore, U.S. Pat. No. 5,670,055A describes a process for dispersing biofilms caused by bacteria or other microorganisms with linear alkyl benzol sulphonates.

U.S. Pat. No. 4,966,716A claims mixtures of organic ammonium hydrohalogens and bromine to control biofouling in aqueous circulation systems.

U.S. Pat. No. 4,297,224 reveals another method for permanently removing biofouling in circulation systems where a bromine-chlorine-hydantoin derivative is constantly added to the cycle to prevent biofouling.

The method specified in U.S. Pat. No. 5,128,045A stabilises ferric and manganese ions while simultaneously preventing biofouling using a mixture of an unsaturated and water-soluble ethylene polymer (possibly with phosphonates), a mono-carboxylic acid, an unsaturated sulphonic acid, methylene bis(thiocyanate) and 2-thiocyanomethylthio) benzothiazol.

EP0397184A1 reveals a process for preventing the growth and reproduction of microorganisms in reverse osmosis membranes by adding chloramine.

DE-A-1083232 concerns a process for regenerating used filter layers also using chloramine in connection with inorganic or organic wetting agents such as quarternary ammonium bases or sulphones. DE-A-1083232 considers it to be known that filter materials can be treated with oxidising materials such as potassium permanganate and subsequently with reducing materials. However, it does not give any concentrations of the oxidising agents or the pH-value of the solutions.

U.S. Pat. No. 4,425,380 concerns removing resin greases from holes in multi-layer printed circuit boards where the resin greases are formed from the polymer printed circuit board material. Highly concentrated alkaline permanganate solutions are used for removing these materials followed by a reduction step.

US 2003/0146169 A1 concerns the production of ferrates, although it does not reveal using ferrates in an alkaline medium followed by a reduction step. US 2003/0132160 also does not concern oxidating with alkaline permanganate solutions.

WO 02/064718 A1 reveals preventative treatment of substrates with acidic permanganate solutions without a reduction step after treating with permanganate.

Prior art focuses on biofouling contamination that can be roughly broken down into three stages.

First of all, it describes processes that eliminate dissolved residues, primarily in the water. They use cleansers that are capable of removing these residues, although they do not possess the capability to dissolve adhering substances.

Secondly, it reveals processes that make it possible to prevent or control biofouling. This means that they prevent the formation of deposits (for instance, by constantly adding substances to the system), although they do not dissolve deposits already formed.

Finally, some processes demonstrate the possibility of removing biofouling deposits, some of which use strong acids that promote corrosion. Beyond this, they demonstrate the application of complex multi-component systems. It is difficult for the user to produce and handle some of these systems. In addition, these systems contain organic additives that are difficult to remove, or aggressive bromine and chlorine compounds that are damaging to health and that can react with organic substances containing halogens. This is the reason why it would not be possible to use them in drinking water systems.

It is the function of this invention to state a new, simple and cost-effective process for cleaning substrates that does not have the disadvantages of prior art and that can also be used in drinking water systems because it only has slight toxic effects.

Surprisingly, it has been discovered that this problem can be solved by a process as per claim 1 whereby permanganate and/or ferrate (VI) is used as an oxidising agent and subsequently one or several reducing agents. Another surprise was the fact that cleaning with permanganate and/or ferrate (VI) has outstanding results in particular in an alkaline medium.

Therefore, the subject matter of this invention is a process for cleaning substrates of the type mentioned at the beginning that is characterised by the fact that cleaning is carried out by at least one oxidising agent selected from a group consisting of permanganate and/or ferrate (VI), and afterwards cleaning is carried out by a reducing agent characterised by the fact that the oxidising agent selected from the group consisting of permanganate and/or ferrate (VI) is available in the form of an alkaline solution, and the oxidising agent dissolved in the solution has a percentage by mass of 0.002 to 0.1 mass-%.

Permanganate is preferably used as the oxidising agent.

The process shall hereinafter be designated as the process of the invention.

This process is used for cleaning substrates. Preferably, the substrate should be contaminated on its surface. The term "surface" is understood to mean any type of surface, although in particular this term not only encompasses macroscopic surfaces, but also microscopic surfaces like pore surfaces, such as those that are found in filters and membranes.

The substrates are preferably selected from the group consisting of filtering devices, classification devices, transport devices and storage devices for fluids.

The filtering devices are preferably selected from the group consisting of filters and membranes. Filtering devices can also be devices used for dialysis of blood.

The classification devices are devices that are used for classification processes. This includes processes such as screening, stream sizing with the separating medium of air, stream sizing with the separating medium of water, and equal falling properties classification.

The transport devices are preferably selected from the group consisting of pipes, pipelines, hoses, capillaries and pumps. The transport devices can also be devices used for dialysis of blood.

The substrates to be cleaned according to the process of the invention may be contaminated with inorganic or organic material. Preferably, the process cleans substrates that are contaminated with organic material (especially preferred are microorganisms, in particular bacteria, especially legionellas). The organic material is preferentially selected from the group consisting of the aggregates, components, excretions and decomposition products of the microorganisms (EPS). Preferably, the organic material consists of the excretions and decomposition products of the microorganisms.

Beyond this, the process of the invention can clean substrates that are contaminated with microbic films or algae.

The oxidising agent preferably consists of salts that dissolve completely in water. Alkali salts are preferred, and especially preferred are potassium or sodium salts, of which potassium salts are used particularly preferably. Furthermore, calcium salts can also be used, for example.

The oxidising agent should be dissolved. The oxidising agent should preferably be dissolved in water. The water should preferentially be partially or completely softened and it is very especially preferred if it is deionised. The solution of the dissolved oxidising agent should be alkaline. In particular, the pH value of the solution should be in a range from 9-14, especially preferred would be 11-14 and very especially preferred would be 12-14.

First of all, the solution is preferably adjusted to be alkaline to create a solution with oxidising agents, and afterwards the oxidising agent is added to the solution.

The dissolved oxidising agent should have a percentage by mass of 0.002 to 0.1 mass-% in solution, although the percentage by mass is by preference 0.01 to 1 mass-%.

Preferably, no other oxidising agents are used in this process. If there are other oxidising agents, their percentage by mass with reference to the total content of oxidising agents should by preference be no more than 20 mass-%, very preferably no more than 10 mass-%, and very especially preferably no more than 5 mass-%.

The reducing agent is preferably selected from a group consisting of sulphuric acids, its salts (such as hydrogen sulphite and sulphite), disulphuric acid, its salts, hydrazine and hydroxylamine. The alkali salts of the sulphuric acids are preferred. Hydrogen sulphite and disulphite (which can also be used for treating drinking water) are especially preferred as reducing agents.

The person skilled in the art is aware of the fact that hydrogen sulphite and disulphite form a balance when dissolved in water.

The reducing agent is preferably dissolved. By preference, the reducing agent is dissolved in water, and the water should especially preferably be partially or completely softened or deionised.

The content of reducing agents is preferably in a range of 0.01 to 10 g/L. A range from 0.1 to 4 g/L is preferred, and 0.5 to 2 g/L is especially preferred.

The reducing agent can be mixed with a metal-salt complexing agent and/or chelating agent. Preferably, the metal-salt complexing agent is oxalic acid or citric acid, a salt of the acids, or a mixture of them. The metal-salt complexing agent is very preferably the salt of an oxalic acid. The salt of the oxalic acid is very especially preferred to be completely soluble in aqueous solutions. In particular, the salt of the oxalic acid is an alkali salt.

The reducing agent can be mixed with an acid. The acid can be any acid; an acid is preferably used that does not attack the substrate. Nitric acid is especially preferred as the acid.

The content of metal-salt complexing agents is preferably 0.01 to 10 g/L and the content is preferred to be about 0.1 to 4 g/L, especially preferred is 0.2 to 2 g/L.

The deposit on the substrate is surrounded by a medium in the process of the invention. Preferably, the medium is a liquid.

The substrate can be surrounded by an alkaline, neutral or acidic medium before or at the same time as adding the oxidising agent. The medium is preferably alkaline and its pH value is preferably in a range from 9-14, especially preferred would be 11-14 and very especially preferred would be 12-14.

Commercially available lyes can be used to increase the pH value. Preferably, sodium hydroxide solution or potash lye is used.

The process of the invention is characterised by the fact that a reducing agent is added after the oxidising agent. Preferably, the pH value is in a range of 7-9 before adding the reducing agent.

It can be cleaned statically or dynamically in accordance with the process of the invention. Statically would mean here that the oxidising agents and the reducing agents would be made to react with the deposits in the resting state. A static process can mean extending the contaminated substrates from an arrangement. Furthermore, this includes putting the contaminated substrates into immersion baths.

The process of the invention is carried out dynamically if the cleansers of the invention exert directed forces on the deposits. This includes processes where the cleansers flow through the substrates. This can be done in thrusts or continuously. Furthermore, this includes the possibility of making the cleansers react with the deposits in a circulation system.

One or several step(s) can be built into the process between adding the oxidising agent and the reducing agent for rinsing the system. Water can be conducted through the system to be cleaned for this purpose. Another step in rinsing or several other steps in rinsing can be carried out after adding a reducing agent. Preferably, partially or completely softened water (especially preferred is deionised water) is used in the step or steps for rinsing between treating with oxidising agents and reducing agents. Preferably, partially or completely softened water (especially preferred is deionised water) is also used in the final step or steps for rinsing.

It can be cleaned once or several times in the process of the invention with the same or various oxidising agents. If it is cleaned several times, one or several steps for rinsing may also be carried out between adding each oxidising agent.

It can be cleaned once or several times in the process of the invention with the same or various reducing agents. If it is cleaned several times, one or several steps for rinsing may also be carried out between adding each reducing agent.

The substrate to be cleaned can, for example, be a membrane installed in a pipeline that is contaminated with EPS. The installed membrane can be bridged over with another pipeline and a pump can be mounted on this bridge. Another bridging pipeline can be closed during normal operation so that water is flowing through the membrane. The feed and drain can be closed for cleaning so that the membrane is in a circulation system with the bridge. The process of the invention for cleaning can be carried out in the circulation system. The materials involved in cleaning can be added to the circulation system and pumped through the membrane. In this fashion, the materials can be intercepted after cleaning so that they do not come into the system of normal operation.

For example, the process can be carried out in the following fashion:
1. blocking the feeds and drains in front of or behind the membrane
2. adding sodium hydroxide solution until a pH value of 12 is reached in the circulation system
3. adding potassium permanganate solution
4. the permanganate solution is pumped in circulation through the membrane for 30 minutes at a particular feed pressure (for instance, 1 bar)
5. water is fed until a neutral to moderately alkaline pH value (7-9) is reached
6. adding sodium disulphite
7. pumping as under item 4
8. rinsing the circulation system until a neutral pH is reached Other cleansers or disinfectants can be added in the process of the invention, which are preferably added in the steps for rinsing and/or to the reducing agent. Anti-corrosive agents, biocides, wetting agents and tensides can be preferentially added.

EXAMPLES

General Examples

A test installation with stainless steel round plates for flat membranes was used for testing the cleaning effect. This membrane is a polyether sulphonic membrane (19.5 cm diameter from the Membrana company in Wuppertal, Germany). The water of a biological test sewage treatment plant was concentrated via membrane filtration and the water enriched with EPS was used as an EPS-concentrate for generating membrane coatings.

Afterwards, it was cleaned for 0.5 h-1.0 h with the cleansers stated in the cross flow process. All tests were carried out at 1 bar feed pressure.

In the absence of other statements, a volume of 500 mL of cleansers was used.

The cleanser was removed with 3 L of desalinated water in the step for rinsing (marked as "+" in the table below) and subsequently the system was operated in circulation with desalinated water and the permeability was determined.

Making the Solutions
Permanganate Alkaline (as Per the Invention)
5 mL of sodium hydroxide solution 45% are dissolved in 450 mL of deionised water 10 mL of $KMnO_4$ 1% are filled to 500 mL of deionised water
Permanganate Acidic (as not Per the Invention)
10 mL of $KMnO_4$ 1%
5 mL of nitric acid 10% are filled to 500 mL of deionised water
Ferrate (VI) (as Per the Invention)
   a) a synthesis of the ferrate (VI):
      according to: Jander, Blasius: Textbook of Analytical and Preparative Inorganic Chemistry, page 395, Hirzel Publishers, Stuttgart, Germany, 1969.
      10 g of iron powder and 20 g of potassium nitrate (dehydrated by melting and precision pulverised) are intimately mixed and layered approximately 1 cm high on an iron plate. Approximately 1 g of a mixture of the two components at a ratio of 1 is added at one point. When the iron plate is heated with a Bunsen burner placed below it (it has to be especially intensely heated at the point with a 1:1 mixture), it ignites and the reaction continues throughout the entire mass with a white fog escaping.

b) making the solution
13 g of solidified melt is ground and mixed with 1 L of water, filtered (with a paper filter), and 300 mL of the filtrate is immediately added to the water. The pH value is 10-11.
Oxalic Acid/Nitric Acid (as Per the Invention)
1 g of oxalic acid
5 mL of nitric acid 10%
are filled to 500 mL of deionised water
Disulphite (as Per the Invention)
2 g of sodium disulphite
are filled to 500 mL of deionised water
Disulphite/Oxalic Acid (as Per the Invention)
1 g of sodium disulphite
1 g of oxalic acid
are filled to 500 mL of deionised water
Hypochlorite 1 (not as Per the Invention)
1 mL of sodium hypochlorite solution 12% (purchased) is filled to 500 mL of deionised water
Hypochlorite 2 (not as Per the Invention)
2 mL of sodium hypochlorite solution 12% (purchased) are filled to 500 mL of deionised water
Hypochlorite 3 (not as Per the Invention)
2 mL of sodium hypochlorite solution 12% (purchased)

5 mL of NaOH 40%
are filled to 500 mL of deionised water
Cleaning Tests
Tests for Removing Coatings on Membranes Tests 1 and 3 are as per the invention and tests 2 and 4 are comparative examples. In the absence of other statements, the cleansers are used at a volume of 500 mL.

|  | test | | | |
| --- | --- | --- | --- | --- |
|  | 1 | 2 | 3 | 4 |
| permeability in L/(m² h bar) before adding EPS concentrate | 980 | 980 | 980 | 980 |
| relative permeability % | 100 ± 2 | 100 ± 2 | 100 ± 2 | 100 |
| EPS concentrate in L | 0.2 | 0.2 | 0.2 | 0.2 |
| exposure time in minutes | 30 | 30 | 30 | 30 |
| rinsing relative permeability % | +10 | +8 | +11 | +13 |
| cleanser 1 | Permanganate alkaline | permanganate acidic | ferrate VI | hypochlorite |
| exposure time in minutes | 30 | 30 | 30 | 30 |
| rinsing relative permeability % | +29 | +8 | +27 | +14 |
| cleanser 2 | hydrogen sulphite | hydrogen sulphite | disulphite/oxalic acid | hypochlorite |
| exposure time in minutes | 30 | 30 | 30 | 60 |
| rinsing relative permeability % | +100 ± 2 | +12 | +77 | +23 |
| cleanser 3 |  | hydrogen sulphite | oxalic acid/nitric acid | hypochlorite |
| exposure time in minutes |  | 30 | 30 | 30 |
| rinsing relative permeability % |  | +92 ± 2 | +107 ± 2 | +49 |

Afterwards, the membrane was cleaned with cleaning procedure 1 in test 4 where the relative permeability was 102%.

The relative permeability of the membrane is reduced by the EPS concentrate in the four tests from an initial 100% to 8%-13%. In test 1, an alkaline permanganate solution is exposed to the EPS for 30 minutes and the permeability increases to 29% after the step of rinsing. Afterwards, the disulphite solution is added to the membrane for 30 minutes and a permeability of 100% is obtained after another step of rinsing, which corresponds to the initial permeability before adding the EPS.

In the second test, an acidic permanganate solution is used instead of the alkaline. The permeability is unchanged at 8% after 30 minutes of exposure and rinsing. Exposure of the disulphite solution twice for 30 minutes increases its permeability to 92% with an intermediate step for rinsing.

In test 3, ferrate (VI) is used as the cleanser. After the exposure period, the permeability increases from 11% to 27%. Using a disulphite/oxalic acid solution twice restores the original permeability (measured at 107%).

In example 4 for comparison, the EPS is exposed to a hypochlorite solution and the permeability is almost unchanged at 14% after 30 minutes of exposure. The permeability is increased to 23% with a double concentrated solution and twice the time (60 minutes). This can be increased to 49% with an alkaline hypochlorite solution. Now, if the cleaning process of the invention is carried out on this membrane in accordance with test 1, it produces complete permeability.

The processes of the invention in the aforementioned examples of 1 and 3 proved to be an effective method for cleaning a membrane contaminated with EPS. The original permeability cannot be restored if a process in accordance with prior art is used.

What is claimed is:

1. A process for cleaning substrates wherein cleaning is carried out by at least one oxidising agent selected from the group consisting of permanganate and ferrate (VI), and subsequently by a reducing agent, wherein: the oxidising agent is in the form of an alkaline solution and the dissolved oxidising agent has a percentage by mass of 0.002 to 0.1 mass-% in the alkaline solution; and the substrate comprises organic material, wherein the organic material comprises aggregates, components, excretions, or decomposition products of microorganisms.

2. A process in accordance with claim 1, wherein the substrate comprises filtering devices, classification devices, transport devices or storage devices for fluids, the filtering devices are selected from the group consisting of filters and membranes and the transport devices are selected from the group consisting of pipes, pipelines, hoses, capillaries and pumps.

3. The process in accordance with claim 1 wherein the microorganisms are bacteria and that the aggregates, components, excretions and decomposition products of the bacteria are extracellular polymer substances (EPS).

4. The process in accordance with claim 3, wherein the bacteria are legionellas.

5. The process in accordance with claim 1, wherein the pH of the alkaline solution is in the range from 9 to 14.

6. The process in accordance with claim 1, wherein the reducing agent is dissolved and it is at least one of sulfurous acid, its salts, disulfurous acid, its salts, hydrazine and hydroxylamine.

7. The process in accordance with claim 1 wherein the reducing agent is mixed with a metal-salt complexing agent.

8. The process in accordance with claim 1 wherein the substrate is surrounded by alkaline medium before or at the same time as adding the oxidising agent.

9. The process in accordance with claim 8 wherein the medium has a pH of 12 or more.

10. The process in accordance with claim 8 wherein the pH of the medium is brought to a range of 7-9 after adding the oxidising agent and the reducing agent is added afterwards.

11. The process in accordance with claim 8, wherein the substrate is rinsed once or several times between adding the oxidising agents and adding the reducing agent and/or it is rinsed once or several times after adding the reducing agent.

12. The process in accordance with claim 8 wherein cleaning can take place once or several times with the same or different oxidizing agents and/or that cleaning can take place once or several times with the same or different reducing agents.

13. The process in accordance with claim 12 wherein one or several steps for rinsing can take place if it is cleaned several times between each time the oxidising agent is added, and/or that one or several steps for rinsing take place if it is cleaned several times between each time the reducing agent is added.

* * * * *

UNITED STATES PATENT AND TRADEMARK OFFICE
CERTIFICATE OF CORRECTION

PATENT NO. : 8,557,049 B2  Page 1 of 1
APPLICATION NO. : 12/676716
DATED : October 15, 2013
INVENTOR(S) : Rainer Fulling It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this

Fifteenth Day of September, 2015

Michelle K. Lee
*Director of the United States Patent and Trademark Office*